United States Patent

Rueff, Jr.

[15] 3,659,219

[45] Apr. 25, 1972

[54] DISCRETE RANDOM VOLTAGE GENERATOR

[72] Inventor: Theodore O. Rueff, Jr., Bellflower, Calif.

[73] Assignee: The United States of America as represented by the Secretary of the Air Force

[22] Filed: Jan. 21, 1970

[21] Appl. No.: 7,957

[52] U.S. Cl. ....................331/78

[51] Int. Cl. ....................H03b 29/00

[58] Field of Search ....................331/78

[56] References Cited

UNITED STATES PATENTS

| | | | |
|---|---|---|---|
| 3,366,779 | 1/1968 | Catherall et al. | 331/78 X |
| 3,171,082 | 2/1965 | Dillard et al. | 331/78 X |
| 3,521,185 | 7/1970 | Ley | 331/78 |

OTHER PUBLICATIONS

Wilikins, A Low Frequency Random Step Generator, Electronic Engineering, June 1964, pp. 386–389

*Primary Examiner*—Benjamin A. Borchelt
*Assistant Examiner*—N. Moskowitz
*Attorney*—Harry A. Herbert, Jr. and Julian L. Siegel

[57] ABSTRACT

A random voltage generator having a counter fed by a noise source for a period of time as controlled by a monostable multivibrator triggered by a delayed initiating pulse. The same pulse not delayed enables a series of AND gates to transfer the counter's value to a transfer register, the value of which is converted to a voltage by a digital-to-analog converter. This voltage can then control a voltage controlled oscillator.

3 Claims, 2 Drawing Figures

INVENTOR
TED O RUEFF Jr.
BY Harry A. Herbert Jr. and Julian L. Siegel
ATTORNEYS

INVENTOR.
TED O. RUEFF Jr.
BY Harry A. Herbert Jr.
Julian L. Siegel and
ATTORNEYS

DISCRETE RANDOM VOLTAGE GENERATOR

BACKGROUND OF THE INVENTION

This invention relates to the generation of random voltages, and more particularly to a novel electronic device for generating discrete random voltages.

The present invention offers an improved random voltage generator over that used in the past. It has a high stability and a high degree of randomness. This discrete random voltage generator has applications in the field of radar, particularly for radars using X band and higher frequencies and for the random scanning of radar antennas. Also, when a radar emits signals of random time duration, it is less susceptible to countermeasures.

SUMMARY OF THE INVENTION

The invention consists of a multibit counter which is triggered for a predetermined time by a noise source. After this random count period, the count is stopped, held, and allowed to stabilize. With the next initiating pulse the stored count is transferred through And gates into a transfer register which operates a digital-to-analog converter that produces a DC voltage which is random from pulse to pulse.

It is therefore an object of the invention to provide a novel random voltage generator.

It is another object to provide a random voltage generator having a superior stability.

It is still another object to provide a random voltage generator with a high degree of randomness.

These and other advantages, features and objects of the invention will become more apparent from the following description taken in connection with the illustrative embodiment in the accompanying drawings, wherein:

Figure 1:
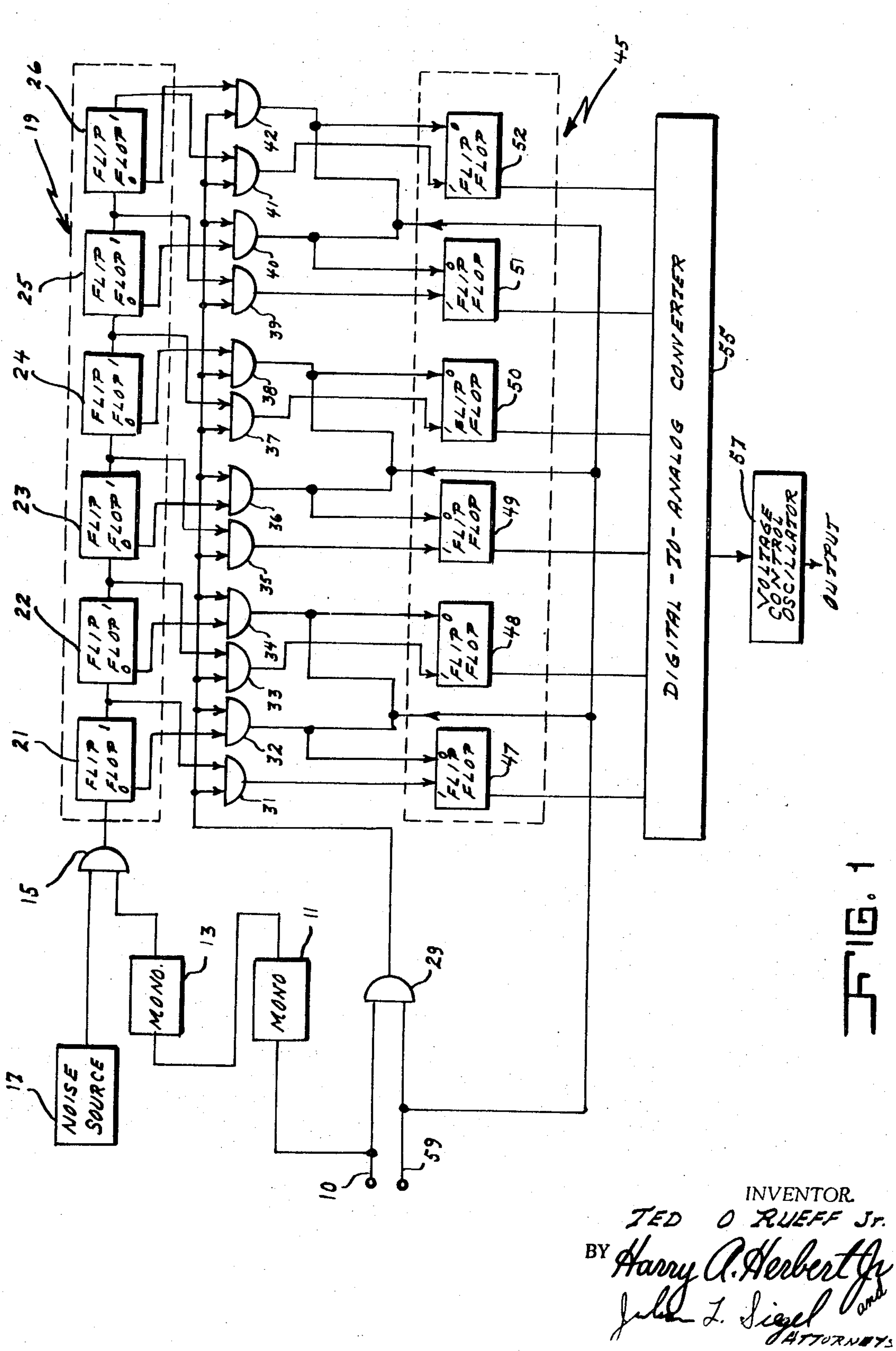
FIG. 1 is a block diagram illustrating an embodiment of the invention.

DETAILED DESCRIPTION OF THE PREFERRED EMBODIMENT the invention is explained in detail by reference to FIG. 1 and using specific values as an illustrative example. However, it is understood that other values can be used within the scope of the invention.

An initiating pulse is applied at point 10 to monostable multivibrator 11 which creates a delay of approximately five microseconds. The delayed output of monostable multivibrator 11 triggers monostable multivibrator 13, the output of which is an enabling pulse of 100 microseconds that is fed to AND gate 15. High frequency thermal noise source 17 is also fed to AND gate 15 which produces an output for 100 microseconds when enabled by monostable multivibrator 13. Hence a noise input from noise source 17 is applied to counter 19 which comprises six flip-flops 21–26. High frequency thermal noise source 17 can be a conventional thermal noise source or the noise source circuit shown in FIG. 2 (to be explained later) can be used. The high frequency noise multitriggers counter 19 for 100 microseconds after which it will contain in binary form the number of times that it has been triggered. This value remains in counter 19 until the next initiating pulse is applied at point 19. This pulse is applied in addition to monostable multivibrator 11 to And gate 29 which, when elabled, allows the initiating pulse to enable transfer gates 31–42. These gates comprise six pairs with each pair being associated with one of the flip-flops of counter 19 with one of the pairs being used for gating the "1" output and the other for gating the "0" output. If the initiating pulse at 10 is applied for 0.5 microseconds, transfer gates 31–42 are enabled for that period. Consequently, during the delay period of monostable multivibrator 11, transfer gates 31–42 are opened for 0.5 microseconds which transfers the binary value of counter 19 to transfer register 45 that comprises flip-flops 47 to 52 corresponding to the flip-flops of counter 19. Each of the flip-flops 47–52 have set and reset input terminals fed by the pairs of transfer gates. The outputs of flip-flops 47–52 then drive digital-to-analog converter 55 to generate an output voltage. A conventional digital-to-analog converter can be used or the thin film digital analog converter manufactured by Autonetics, No. 83523-506. The output of digital output converter 55 can be used to control voltage controlled oscillator 57.

Operating voltage is applied at point 59 to enable gate 29 and at the same time to reset flip-flops 47–48. When in the non-operating mode, point 59 is returned to ground potential.

The discrete random voltage generator has a complete change of DC level output for each pulse repetition frequency and is noncyclic with an output of 64 possible DC levels when using a six-stage binary counter. The output is completely noncoherent. By modifying the number of stages in the binary counter, different numbers of DC levels can be achieved.

Figure 2:
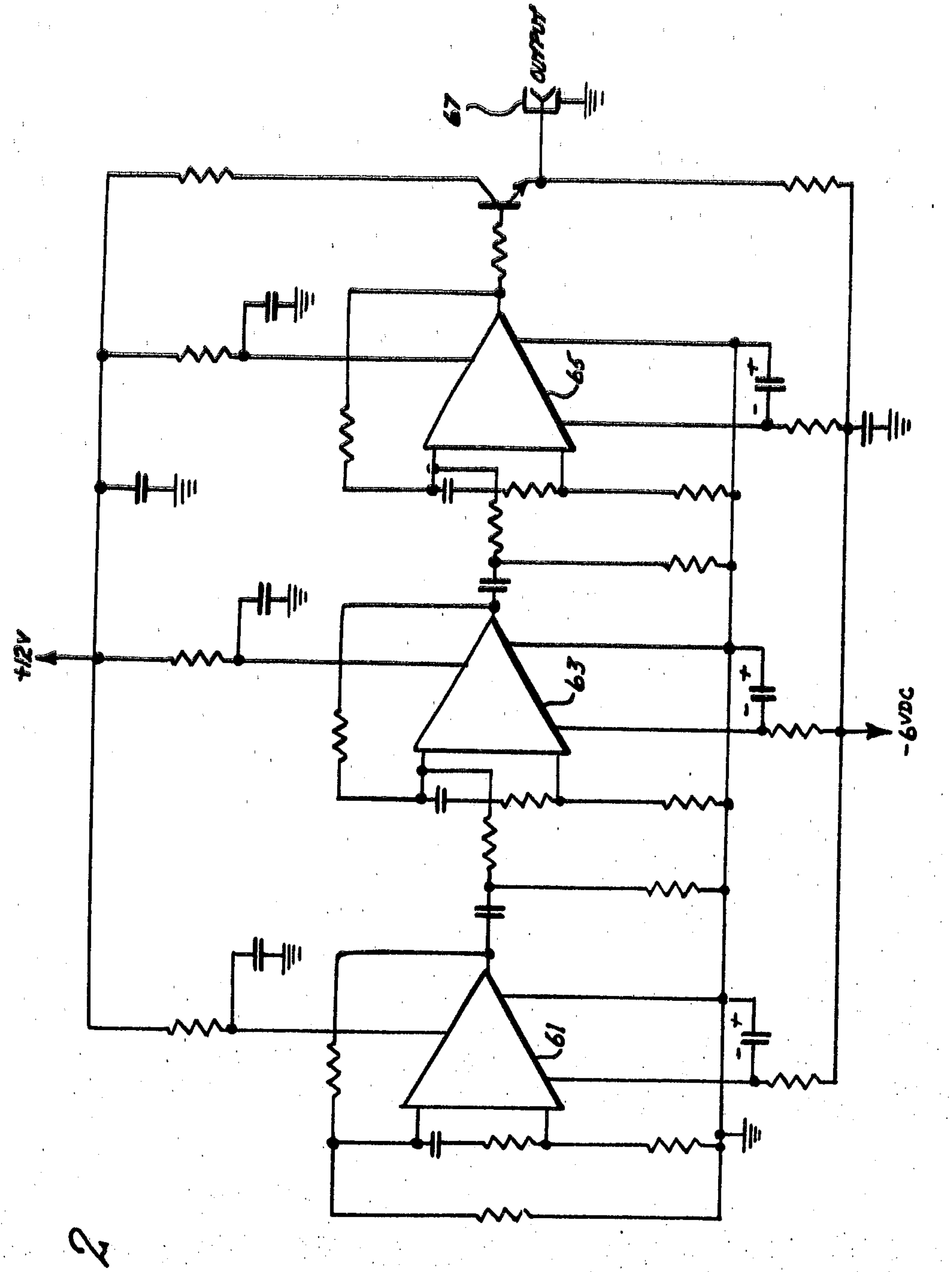
FIG. 2 is a circuit diagram of a thermal noise source that can be used in connection with the invention.

A noise source is shown in FIG. 2 which utilizes thermal noise derived from resistors in the circuits that are actively involved in signal processing. Further, noise generation is obtained from operational amplifiers 61, 63 and 65 and the output is available at point 67 which can be coupled to the discrete random voltage generator.

I claim:

1. A discrete random voltage generator comprising:
   - a. a thermal noise source;
   - b. a binary counter fed by the thermal noise source for counting the numbered input pulses from the noise source;
   - c. means for time controlling the input of the thermal noise source to the counter for a predetermined period upon the reception of an initiating pulse;
   - d. means for delaying for a predetermined time the initiating pulse to the time controlling means;
   - e. a digital-to-analog converter fed by the output of the binary counter producing a voltage dependent upon the binary count of the noise source; and
   - f. means for transferring the binary value of the counter to the digital-to-analog converter, the transferring means including,
     1. a series of pairs of AND gates, each of the pairs fed by the complementary binary outputs of the counter when enabled by the initiating pulse, and
     2. a transfer register having a series of flip-flops, each of the flip-flops being fed by one pair of the AND gates.

2. A discrete random voltage generator according to claim 1 which further comprises a voltage controlled oscillator fed by the digital-to-analog converter.

3. A discrete random voltage generator according to claim 2 where the time controlling means and the delaying means are monostable multivibrators.

* * * * *